United States Patent

[11] 3,571,620

[72] Inventors Robert B. Hansen
Arlington Heights;
Gordon E. Reichard, Franklin Park, Ill.
[21] Appl. No. 764,859
[22] Filed Oct. 3, 1968
[45] Patented Mar. 23, 1971
[73] Assignee Motorola Inc.
Franklin Park, Ill.
Continuation-in-part of application Ser. No. 644,301, June 7, 1967, now abandoned.

[54] CHARGING CIRCUIT FOR ESTABLISHING A DC VOLTAGE LEVEL
17 Claims, 6 Drawing Figs.

[52] U.S. Cl. .... 307/233, 307/238, 307/304, 325/391, 328/140, 340/171
[51] Int. Cl. .... H03k 5/20
[50] Field of Search .... 307/233, 251, 293, 304, 238; 328/138, 170; 340/171; 325/390—2, 394

[56] References Cited
UNITED STATES PATENTS
3,281,701 10/1966 Axe .... 307/233X

*Primary Examiner*—Donald D. Forrer
*Assistant Examiner*—John Zazworsky
*Attorney*—Muller & Aichele

ABSTRACT: A desired DC voltage level is developed across a capacitor by applying a signal of a particular frequency to the capacitor through a neon tube. The voltage level stored in the capacitor is coupled to other circuitry by a field effect transistor. The capacitor, neon tube and field effect transistor are packaged in an opaque epoxy to increase the resistance of leakage paths. Clamping circuits are used to limit the range of the voltage stored in the capacitor. The input to the charging circuit is balanced for noise and unbalanced for the signal frequency to provide noise immunity.

INVENTORS
ROBERT B. HANSEN
GORDON E. REICHARD
BY
Mueller, Aichele and Rauner
ATTYS.

CHARGING CIRCUIT FOR ESTABLISHING A DC VOLTAGE LEVEL

This application is a continuation-in-part of the application of Robert B. Hansen and Gordon E. Reichard, Ser. No. 644,301, filed Jun. 7, 1967, now abandoned.

BACKGROUND OF THE INVENTION

It is often desirable to develop a DC control voltage, the magnitude of which can be controlled from a remote location. Since it is difficult to develop a precise DC voltage level over long distances, alternating current signals, transmitted either on an RF carrier, wire lines or as sound signals, are used to control the magnitude of the DC control voltage. Where more than one control function is desired, the control signals are given different frequencies for each function so that the receiving system can distinguish between them.

An example of a system in which such control is desirable is a remote control device for a color television receiver. DC voltage levels can be used to control, for example, the hue and the chroma of the television set by varying the bias on a transistor to change its resistance or a varicap to change its capacitance. In order that the set may operate properly the DC voltage level must be set from a remote location and must be stable at the set level for long periods of time. The control signals, which are of different frequencies for each control function, may be transmitted to the receiver by an RF carrier, wire lines, or as sound signals. The control signals are converted into electrical signals of a corresponding frequency and applied to the control circuit.

In present day circuits using this type of system, vibrating reed relays are used to convert the particular alternating current signals to direct current control signals. The vibrating reed relays are used to distinguish between the different control signal frequencies so that the proper control function is carried out. Vibrating reed relays have a very high Q and therefore their alignment is critical. In practice it may be necessary to align a particular control system to a particular receiver so that the control system cannot be used reliably with any other receiver. Thus in the manufacture of thousands of systems each control must be matched to its particular receiver. Further, because of the mechanical nature of the system, jarring of the transmitter can cause the tuning to shift sufficiently to destroy the alignment. Since the transmitter is a hand-held device used by persons completely unfamiliar with electronic and mechanical systems, it is very likely that the transmitter alignment will not remain accurate over a long period of time.

Since the stored voltage level in the set determines the operation of the set it is desirable to establish the proper voltage levels at the factory during manufacture. The preset voltage level must be maintained for many months until the set is again operated, either in a store or in the home. In order to obtain the long storage times required for presetting the voltage, the input and output circuits of the storage device must have extremely high impedances. Prior art storage devices, simple and inexpensive enough to be used in a television set, do not have sufficiently high impedances to store a voltage for long periods of time.

SUMMARY

It is, therefore, an object of this invention to provide a remote control system developing a DC control voltage in response to control signals of various frequencies supplied to the control system.

Another object of this invention is to provide a remote control system using AC control signals to generate a direct current control voltage.

Another object of this invention is to provide a remote control system having a high immunity to noise signals.

A further object of this invention is to provide a remote control system with an inexpensive storage element having an extremely long storage time.

In practicing this invention tuned circuits are provided for detecting alternating current signals of a particular frequency. Diodes rectify the alternating current signals so that a pulsating control signal of a single polarity is obtained in response to an alternating current signal of a particular frequency. The control signal is applied to a capacitor through a neon tube and is of a sufficient amplitude to cause the neon tube to conduct. A high input impedance amplifier is also connected to the capacitor to couple the voltage across the capacitor to utilization circuits. With no input signal applied to the neon tube, the tube is nonconducting and presents a very high impedance to the capacitor. Thus there is no appreciable drop in the voltage across the capacitor over a long period of time. In color television receivers a change in voltage of 10 percent is required to produce a noticeable change in the picture. In practice, this circuit has shown a voltage drop of less than 1 percent in 1,000 hours. This is desirable so that the receiver can be preset at the factory and will be close to the desired setting when sold.

Clamping diodes are provided at the input to the neon tube to prevent the voltage level across the capacitor from exceeding a predetermined magnitude to prevent a malfunction of the control system. A second tuned circuit is provided with a rectifying diode poled to give a pulsating signal of the opposite polarity which is applied to the capacitor through the neon tube. The second pulsating voltage acts to discharge the capacitance and thereby reduce the magnitude of the signal across the capacitor. By this means the charge stored across capacitor can be changed to the desired level. The two tuned circuits are coupled in a balanced circuit with respect to noise voltage so that the noise voltages supplied to the neon tube cancel. Since only one of the two tuned circuits responds to an alternating current signal of a particular frequency, the system is unbalanced with respect to the alternating current signal and the cancellation does not take place.

The capacitor which acts as the storage element is chosen to have a very high leakage impedance. Also the input and output circuits must have very high impedances when they are in the off state. An insulated gate field effect transistor (IGFET) is used as the output circuit and a neon tube is used as the input circuit. Both of these components have extremely high impedances and thus the leakage currents will be very small.

However, provision must be made for mounting the components in the television set. In order to maintain the required high impedance levels the components are mounted on a board with the critical common junction of the three components positioned away from the board. By this means the relatively low impedance leakage paths presented by the board do not affect the storage time.

If the critical junction of the three components were permitted to remain in air, contaminants, on the wires, components and board would reduce the leakage resistances to unacceptable values. Accordingly, the storage assembly is cleaned and encapsulated in an epoxy compound. The leakage resistance characteristics are further improved if the encapsulated assembly is placed in a silica gel solution in a vacuum to backfill the assembly.

The resistance of the neon tube is determined by the amount of ionization of the neon gas. When a voltage is applied to the tube the resultant electric field causes the gas to ionize and a current flows. However, when there is no voltage applied to the neon tube light photons striking the neon gas can cause ionization. Although this ionization is slight it is enough to lower the leakage resistance to an unacceptable value. Accordingly, the epoxy used for encapsulation is made opaque so that light is prevented from striking the neon tube and decreasing its leakage resistance.

The system is shown in the drawings of which:

DESCRIPTION OF THE SYSTEM

Figures 1, 2, 3, 4, 5, 6:
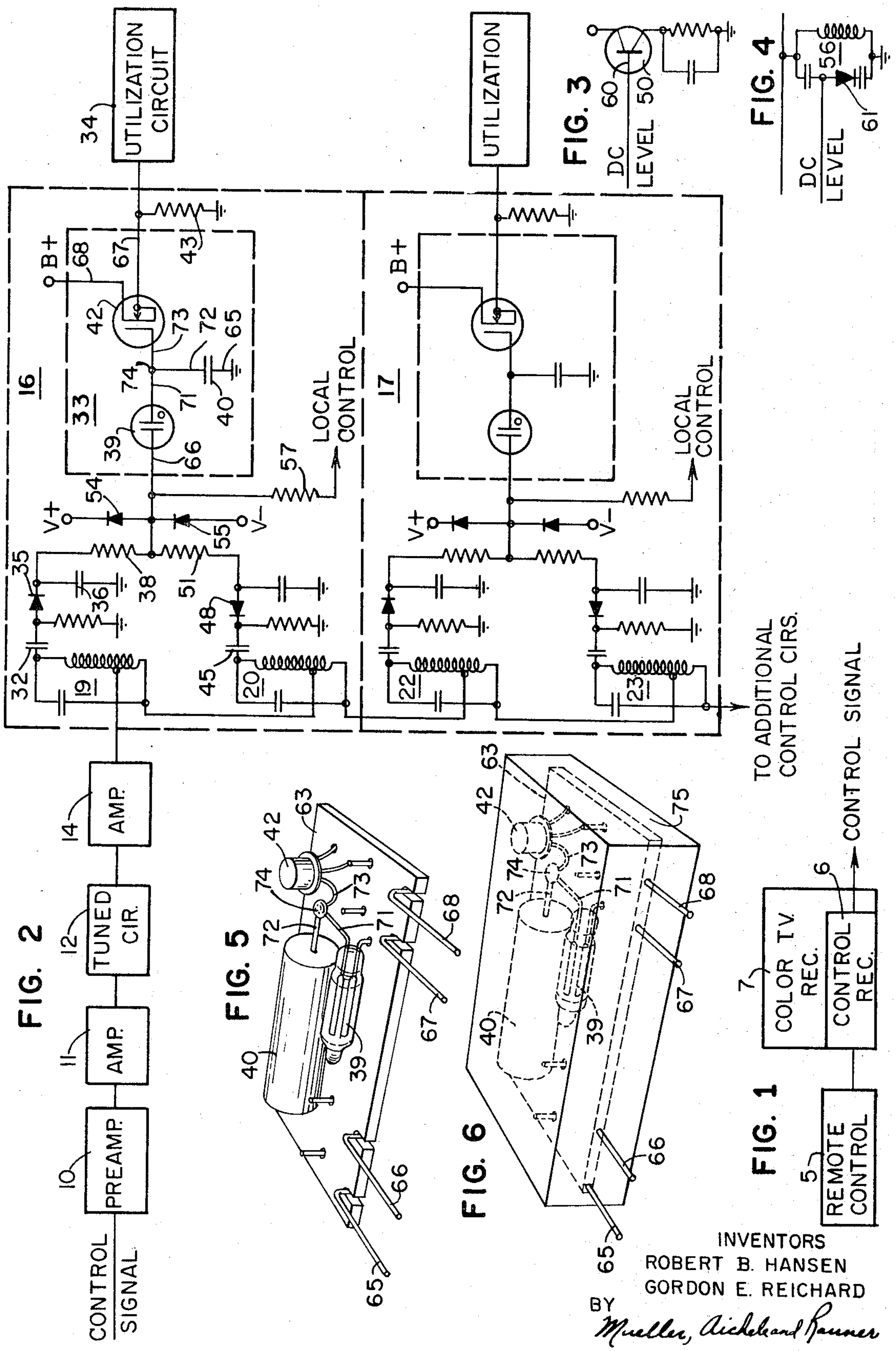
FIG. 1 is a block diagram of a remote control system.
FIG. 2 is a partial schematic and partial block diagram of a circuit incorporating the features of this invention.
FIGS. 3 and 4 are examples of utilization circuits which may use the DC voltage developed by this system.
FIG. 5 is a isometric drawing of the components comprising the storage module.
FIG. 6 is an isometric drawing of the storage module encapsulated.

In FIG. 1 a remote control system 5 transmits a signal to a control receiver 6 of a color TV receiver 7. Control receiver 6 develops a control signal, in response to the signal from remote control system 5, which may be used to control the operation of color TV receiver 7.

In FIG. 2, a system is shown which may be used to develop DC control voltages for regulating, for example, the hue and chroma of a color television receiver. A control signal is transmitted from the remote station and may be a tone carrier by an RF carrier, a wire line, or as a sound signal. The control signal is received at the receiver and is changed to an electrical signal of the proper frequency to carry out the control function desired and is applied to preamplifier 10. The output of preamplifier 10 is amplified in amplifier 11 and coupled to amplifier 14 through tuned circuit 12. Tuned circuit 12 is a band-pass filter which passes only the control frequencies which operate the system.

The output of amplifier 14 is coupled to control circuits 16 and 17. Control circuit 16 may provide the DC voltage to control the hue of the television receiver while control system 17 may provide a DC voltage to control the chroma circuits of the color television receiver. The output signal from amplifier 14 is applied to tuned circuits 19, 20, 22 and 23 connected in series. The output of tuned circuit 23 may be coupled to additional control circuits to apply the control signal thereto if additional controls are desired.

Only one of the tuned circuits 19, 20, 22, 23 is responsive to a control signal of a particular frequency. Assume that a control signal of the frequency to which tuned circuit 19 is tuned is received. The output signal from tuned circuit 19 is coupled to diode 35 through capacitor 32. Diode 35 rectifies the signal to develop a positive pulsating signal which is filtered by capacitor 36 and applied through resistor 38 to storage module 33. Resistors 38 and 51 determine the charging time constant of the circuit and isolate the two tuned circuits 19 and 20 from each other.

The signal voltage from resistor 38 is applied to the input of neon tube 39 to cause the neon tube to conduct and apply the positive pulsating signal to capacitor 40 charging the capacitor. When the input signal ceases, neon tube 39 stops conduction and capacitor 40 holds its charge at the level to which it was charged. Capacitor 40 is chosen to have a very high leakage resistance and neon tube 39 has an extremely high resistance when it is not conducting so that the charge on capacitor 40 remains at its established voltage level. The voltage level on capacitor 40 is coupled to utilization circuit 34 through field effect transistor (F.E.T.) 42, which may be an Insulated Gate Field Effect Transistor (IGFET) having a very high input resistance.

When a signal is received of the frequency to which tuned circuit 20 is tuned, it is coupled to neon tube 39 through coupling capacitor 45, resistor 51 and diode 48. Diode 48 rectifies the signal so that a negative pulsating signal is applied across neon tube 39 causing the tube to conduct. The negative pulsating signal discharges the voltage appearing across capacitor 40 to change the conduction of F.E.T. 42 and thus the voltage appearing across resistor 43. When the signal stops the conduction of neon tube 39 stops so that the voltage level established across capacitor 40 remains constant.

A local control signal may be applied through resistor 57 to neon tube 39 to change the charge on capacitor 40. Since the local control signal can be connected directly to the proper neon tube, tuned circuits 19 and 20 are not necessary for the local control.

Noise signals appearing at the output of amplifier 14 produce substantially equal output signals from tuned circuits 19 and 20. These positive and negative voltages are applied to neon tube 39 through resistors 38 and 51 and cancel each other so that the noise voltages applied to neon tube 39 do not cause the tube to conduct, thus providing noise protection to the system. Only one of the tuned circuits 19 and 20 responds to a desired signal so that there is no signal cancellation with an alternating current signal of the particular frequency to which either tuned circuit 19 or 20 is tuned.

In the system shown, the output signals from tuned circuits 19 and 20 could be strong enough to develop a charge across capacitor 40 which would bias F.E.T. 42 into a region where operation of a system would become difficult or impossible. To prevent this, clamping diodes 54 and 55 are used to limit the positive and negative excursions of the signal applied to neon tube 39. Thus the magnitude of the voltages appearing across capacitor 40 is limited. The V-voltage applied to diode 55 may be made equal to the ionization potential of tube 39 so that a negative voltage cannot be developed across capacitor 40 and F.E.T. 42 cannot receive a negative bias.

In FIG. 3 a transistor 50 is shown which may be an example of a utilization circuit shown in FIG. 2. The DC potential applied to base 60 of transistor 50 regulates the conduction of transistor 50 and thus the resistance of the transistor. Transistor 50 may be part of a phase shifting network in which the amount of phase shift is determined by the resistance of transistor 50.

Another example of a utilization circuit is shown in FIG. 4, in which the DC potential is applied to a varicap diode 61. Diode 61 is part of a tuned circuit 56. The DC voltage applied to varicap 61 determines the capacitance of the diode and thus the resonant frequency of tuned circuit 56.

FIG. 5 shows the placement of the components forming the storage module 33 on a printed circuit board 63. Printed circuit board 63 is of standard construction with the printed circuit pattern being placed on the reverse side and not shown in FIG. 5. Four wires extend from the board with wire 65 connected to capacitor 40, wire 66 connected to neon tube 39, and wires 67 and 68 connected to F.E.T. 42. Wires 65—68 are also shown in FIG. 2 as are wires 71—74 to be described subsequently.

As shown in FIG. 5, wires 71, 72 and 73 from neon tube 39, capacitor 40 and F.E.T. 42 respectively, are connected together at junction 74. Junction 74 is positioned away from board 63 so that the relatively low leakage resistance of the board will not affect the charge stored in the capacitor.

If the storage module were used as shown its performance could deteriorate over a period of time. Contaminants present in the atmosphere could coat board 63 and wires 71, 72 and 73 to lower the resistance of leakage paths which are present. Further leakage paths exist in the air which are of relatively low impedance compared to the impedances of F.E.T. 42 and neon tube 39. Thus it is necessary to protect the storage module from contaminants to preserve the initially high leakage impedances.

To provide protection for the module 33 it is encapsulated in epoxy. The epoxy surrounds the components and the critical junction 74 to prevent contaminants from lowering the very high leakage impedances which are present. Prior to encapsulation the module may be cleaned ultrasonically with a solvent such as alcohol.

A further requirement of the epoxy material used to encapsulate the module is that it be opaque so that light is prevented from reaching neon tube 39. Light photons act to ionize the neon gas lowering the leakage impedance of neon tube 39. While such ionization is slight it will have an appreciable effect on on the length of time a charge can be stored in capacitor 40. Capacitor 40 may be a capacitor having a polycarbonate dielectric.

We claim:

1. A control circuit for developing a desired DC voltage level in response to an alternating current signal of a particular frequency applied thereto, including in combination, tuned circuit means including inductance means and first capacitance means adapted to receive the alternating current signal of said particular frequency, rectifying means coupled to said tuned circuit means, said tuned circuit means being responsive to the alternating current signal of said particular frequency to couple the same to said rectifying means, said rectifying means being responsive to the alternating current signal coupled thereto to provide a pulsating control signal of one polarity, a memory module including high impedance output circuit means, a second capacitance means coupled to said high impedance output circuit means and bidirectional voltage-sensitive switching means responsive to a potential thereacross in either direction greater than a predetermined magnitude to become conductive and responsive to a potential thereacross less than said predetermined magnitude to become nonconductive, said voltage-sensitive switching means coupling said second capacitance means to said rectifier means and being responsive to said pulsating control signal greater than said predetermined magnitude to become conductive whereby the charge on said second capacitance means is changed to develop thereacross a voltage of said desired level.

2. The control circuit of claim 1 wherein, said voltage-sensitive switching means is a neon tube and said high impedance output circuit means is a field effect transistor.

3. The control circuit of claim 2, further including clamping means coupled to said voltage-sensitive switching means for limiting the maximum amplitude of said pulsating control signal whereby the maximum amplitude of said desired voltage level is limited.

4. The control circuit of claim 2 further including, tuning means having a varactor coupled to said field effect transistor, said varactor being responsive to said voltage on said second capacitance means to regulate the frequency response of said tuning means.

5. The control circuit of claim 2 further including mounting means, said neon tube, said field effect transistor and said second capacitance means being positioned on said mounting means, a junction point connected to each of said neon tube, said field effect transistor and said second capacitance means, said junction point being spaced away from said mounting means so that it is not in contact therewith, said mounting means, said neon tube, said field effect transistor, said second capacitance means and said junction point being encapsulated in epoxy for insulation thereof.

6. The control circuit of claim 5 wherein, said epoxy is opaque whereby light is prevented from reaching said neon tube.

7. A control circuit for developing a desired DC voltage level in response to alternating current signals applied thereto, including in combination, first and second tuned circuit means each including inductance means and first capacitance means, said first and second tuned circuit means being adapted to receive the alternating current signals, first and second rectifying means coupled to said first and second tuned circuit means respectively, said first and second tuned circuit means being responsive to an alternating current signal of a first particular frequency and a second particular frequency respectively to couple the same to said first and second rectifying means respectively, said first and second rectifying means being responsive to said alternating signals coupled thereto to develop first and second pulsating control signals respectively with said first and second pulsating control signals being of opposite polarity, a memory module including high impedance output circuit means, second capacitance means coupled to said high impedance output circuit means and voltage-sensitive switching means responsive to a potential greater than a predetermined magnitude to become conductive and responsive to a potential less than said predetermined magnitude to become nonconductive, said voltage-sensitive switching means coupling said second capacitor means to said first and second rectifier means and being responsive to either of said first and second pulsating control signals greater than said predetermined magnitude to become conductive whereby the charge on said second capacitance means is changed in accordance with the polarity of the control signal causing the conduction of the switching means to develop a voltage of said desired level across the second capacitance means.

8. The control circuit of claim 7 wherein, said voltage sensitive switching means is a neon tube and said high impedance output circuit means is a field effect transistor.

9. The control circuit of claim 8, further including a pair of clamping diodes coupled to said neon tube and said first and second rectifying means, one of said diodes being coupled to a reference potential of a particular polarity and being poled to limit the maximum amplitude of said desired voltage of said particular polarity, the other of said diodes being coupled to a reference potential of a polarity opposite to said particular polarity and poled to limit the maximum amplitude of said desired voltage of said opposite polarity.

10. The control circuit of claim 9 further including, first and second resistance means coupling said first and second rectifying means respectively to said neon tube.

11. A memory module for storing a charge, including in combination, capacitance means, a neon tube coupled to said capacitance means, said neon tube being adapted to receive a control signal and being responsive to said control signal above a predetermined magnitude to become conductive whereby said capacitance means is charged to a desired level, and a field effect transistor coupled to said capacitance means and providing an output circuit for the memory module.

12. The memory module of claim 11, further including mounting means, said neon tube, said field effect transistor and said capacitance means being positioned on said mounting means, a junction point connected to each of said neon tube, said field effect transistor and said capacitance means, said junction point being spaced away from said mounting means so that it is not in contact therewith.

13. The memory module of claim 12 further including light shield means covering said neon tube to prevent light from reaching the same.

14. The memory module of claim 12 wherein, said mounting means, said neon tube, said capacitance means, said field effect transistor and said junction are covered with insulating material.

15. The memory module of claim 14 wherein, said insulating material is epoxy.

16. The memory module of claim 15 wherein, said epoxy is opaque.

17. The memory module of claim 16, and further including, tuned circuit means adapted to receive alternating current signals, rectifying means coupling said tuned circuit means to said neon tube, said tuned circuit means being responsive to alternating current signals of a particular frequency to couple the same to said rectifying means, said rectifying means being responsive to said alternating current signals coupled thereto to develop said control signal and couple the same to said neon tube.